Oct. 31, 1933.  W. K. HOWE  1,932,970
BRAKE
Filed Oct. 14, 1929   3 Sheets-Sheet 1

INVENTOR
W. K. Howe,
BY Neil A. Preston,
his ATTORNEY

Oct. 31, 1933.  W. K. HOWE  1,932,970
BRAKE
Filed Oct. 14, 1929  3 Sheets-Sheet 2
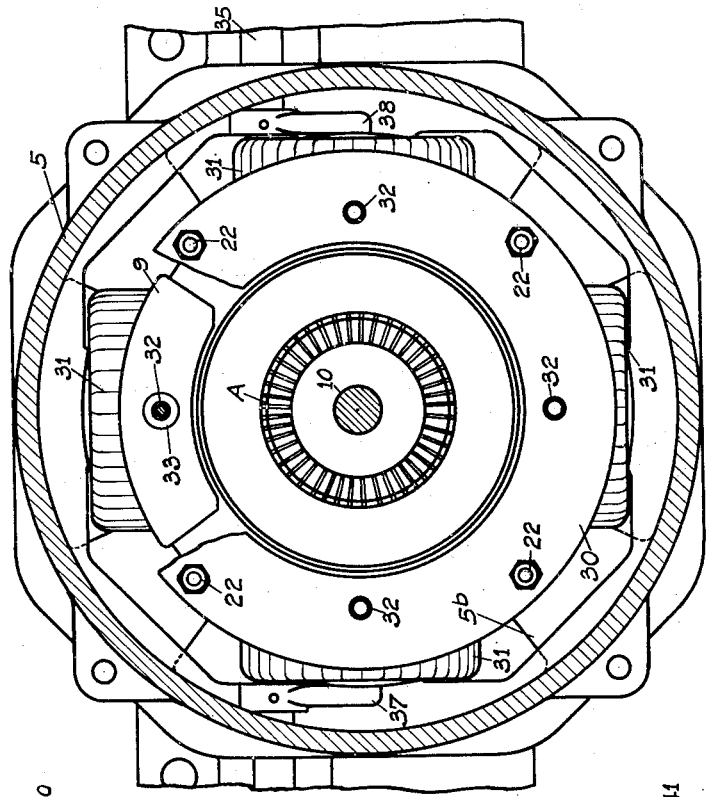
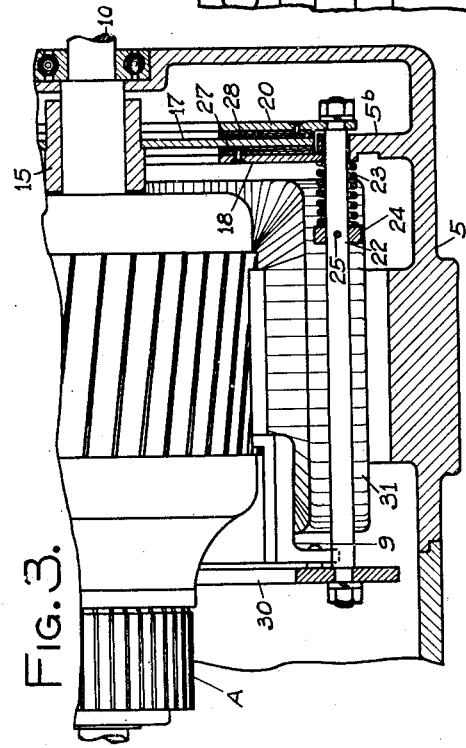
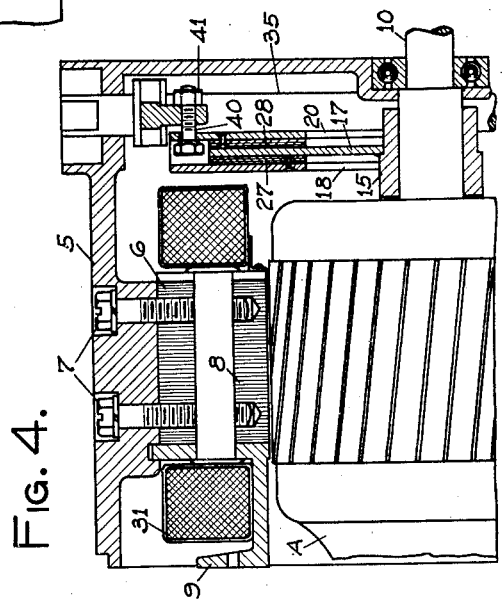
INVENTOR
W. K. Howe,
BY Neil D. Ralston,
his ATTORNEY

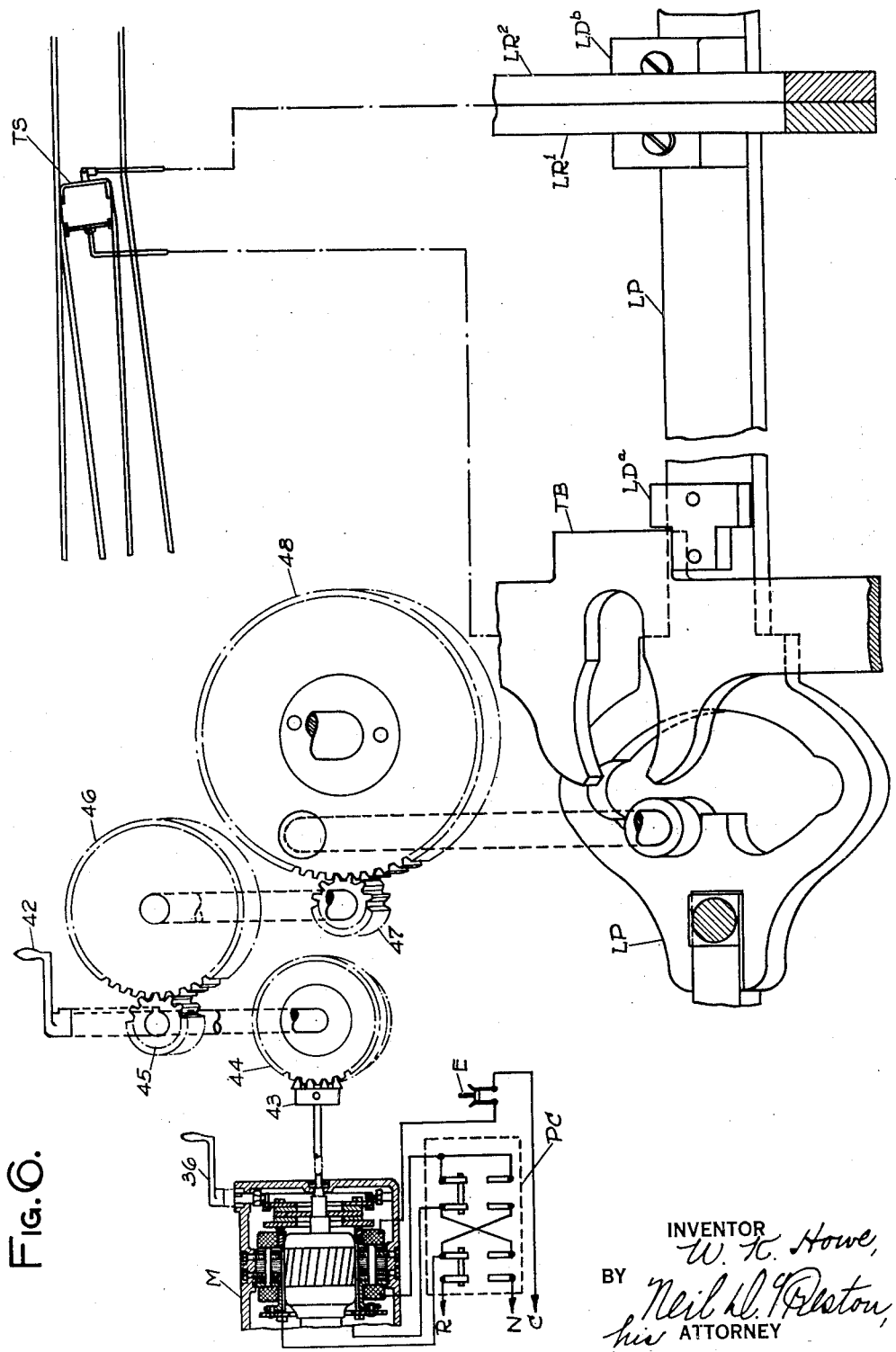

Patented Oct. 31, 1933

1,932,970

UNITED STATES PATENT OFFICE 1,932,970

BRAKE

Winthrop K. Howe, Rochester, N. Y., assignor to General Railway Signal Company, Rochester, N. Y.

Application October 14, 1929. Serial No. 399,548

8 Claims. (Cl. 188—172)

This invention relates to power operated switch machines for railroad track switches, and more particularly pertains to an electro-magnetic brake for use with the electric motors of such switch machines.

In interlocking systems, it is desirable to provide switch machines with means for preventing their operation except at such times that authorized power is applied, or at such times that said switch machines are to be manually operated. One embodiment, of a means for accomplishing these purposes, is supplied by the provision of an electro-magnetic brake which normally prevents the operation of the switch machine to which it is applied, but may be released by the application of power to the motor of said switch machine, or may be released by manual means. Such an electro-magnetic brake prevents movement of the switch points associated with a particular switch machine, should that switch machine fail for one reason or another to reach its fully locked position. Thus, the engagement of a thin car wheel flange may be prevented in the case of a facing point move and thereby prevent the derailment of a train.

One purpose of this invention is to provide a switch machine with an electro-magnetic brake which is directly associated with the electric motor of said switch machine in a manner such that the brake shall be released only at such times that said electric motor receives operating power. More specifically, the present invention proposes to provide extended pole pieces upon the pole structure of the switch machine motor, having associated therewith a brake armature which is attracted whenever the field structure is energized and thereby releases the braking means.

A further object is to provide means for manually releasing said brake at such times that power is not supplied to the switch machine motor.

Other objects, purposes and characteristic features of the present invention will be in part obvious from the accompanying drawings, and in part pointed out as the description of the invention progresses.

In describing the invention in detail, reference will be made to the accompanying drawings in which like reference characters indicate corresponding parts in the several views, and in which:—

Fig. 3 is a sectional view taken on line 3—3 of Fig. 2;

Fig. 4 is a sectional view taken on line 4—4 of Fig. 2;

Fig. 5 is a sectional view taken on line 5—5 of Fig. 1;

Fig. 6 is a diagrammatic representation of a switch machine, its associated track switch and its operating electric motor with the electro-magnetic brake of the present invention applied thereto.

Figure 2:
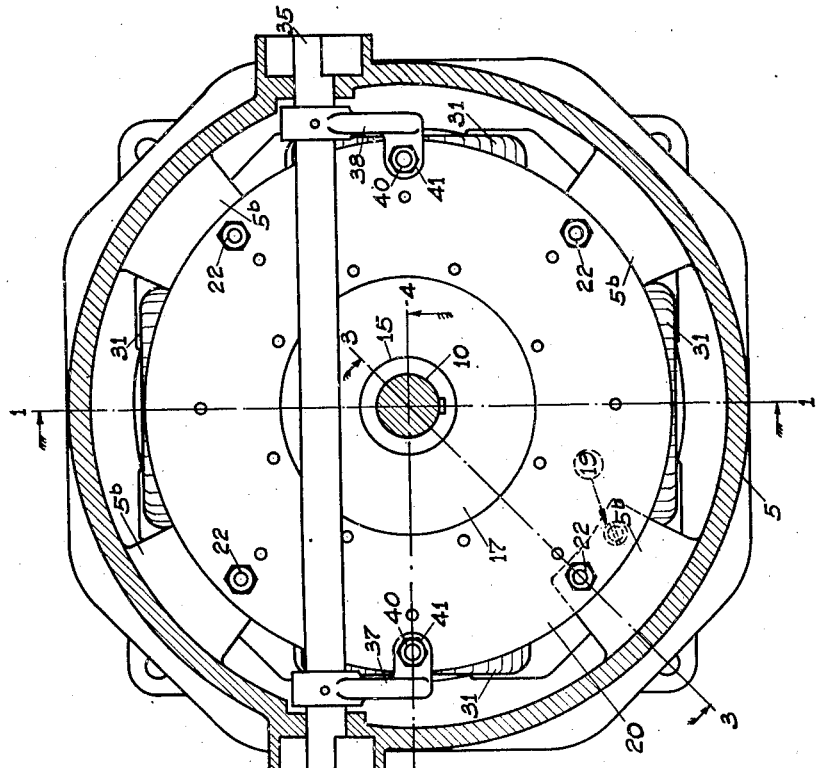
Fig. 2 is a sectional view taken on line 2—2 of Fig. 1.
Figure 1:
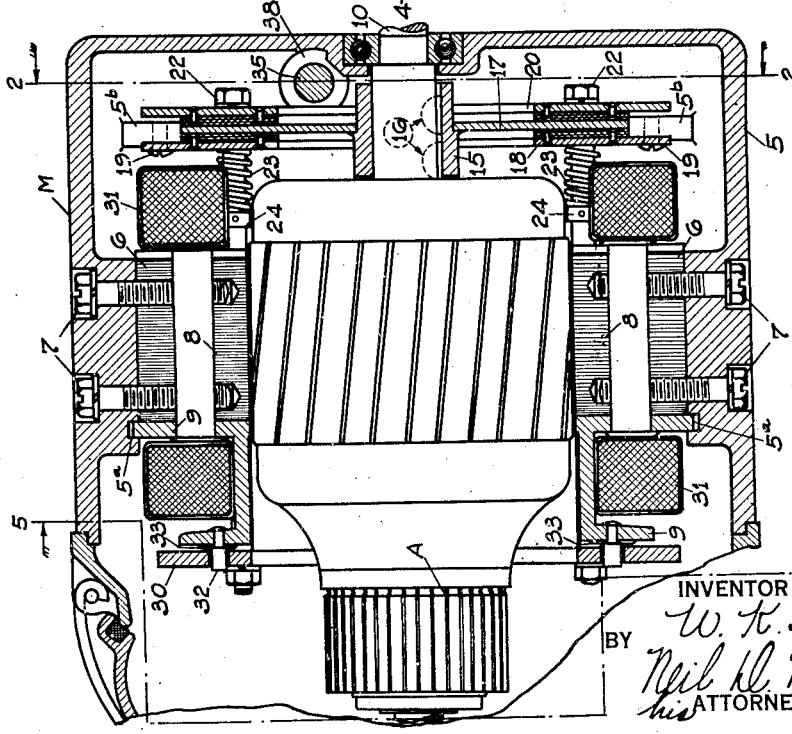
Fig. 1 is a sectional view taken on line 1—1 of Fig. 2 of an electric motor having an electro-magnetic brake, constructed according to the present invention, applied thereto.

With reference to Fig. 1 of the accompanying drawings, a switch machine motor M is shown provided with a casing 5 which serves to support field laminations 6 that are held in place by bolts 7. Associated with the laminations 6 and connected thereto by rivets 8 are the extended pole pieces 9 corresponding in number to the number of poles of the motor M. These extended pole pieces 9 are further held in position by a slot 5ª within the casing 5.

There is an armature A associated with the field laminations 6 and cooperating therewith to produce the motive power for the associated switch machine. This armature A is mounted upon a shaft 10 which is suitably journalled in the casing 5 of the motor.

A bushing 15 is keyed to the shaft 10 by keys 16 in a manner which permits bushing 15 to slidably move in a lateral direction upon said armature shaft 10. Attached to the bushing 15 by welding or other suitable manner, is a disc 17 which is caused to rotate with the armature A.

On the armature side of the disc 17 is a fixed braking member 18, suitably attached to the frame 5 of the motor M by screws 19. On the opposite side of the disc 17 is a movable braking member 20, which is mounted by bolts 22 passing through a projection 5ᵇ of the casing 5 and through the two braking members 18 and 20 (see Fig. 3). These bolts 22 are shouldered and threaded so that they are firmly secured to the movable braking member 20 by the usual nuts and lock washers.

Coil springs 23 over the bolts 22 are compressed to such a position that washers 24 may be pinned in position by suitable cotter keys 25 (see Fig. 3).

On the inside of the braking members 18 and 20, and attached thereto respectively, are brake linings 27 and 28, which are caused to clutch the rotatable disc 17 due to the bias supplied by the coil springs 23.

Shoulders and threads are also provided at the opposite ends of the bolts 22, so that a brake armature 30 may be securely attached thereto by the usual nuts and lock washers. These bolts 22 determine the position of the brake armature 30 at a predetermined distance from the extended pole pieces 9 to provide suitable pick-up values. In other words, the air gap between the brake armature 30 and its cooperating pole pieces 9 is of a value to cause the brake armature 30 to be attracted when the normal operating current is supplied to the field windings 31.

The brake armature 30 is held in a position opposite the pole pieces 9 by the protruding rivets 32, which fit through suitable holes in said armature 30. These rivets 32 are provided with shoulders to hold copper or other non-magnetic metal residual washers 33 in position, which prevent the brake armature 30 from becoming stuck in an energized position due to the residual magnetism in the field structure.

On each side of the motor M, are holes in the casing 5 for mounting a shaft 35 which is in an off centre relationship to the armature shaft 10. Suitable projections in the casing 5 are provided to protect the ends of the shaft 35, which ends have an irregular shaped periphery that fits the inside contour of a crank 36. Two arms 37 and 38 are mounted on this shaft 35 which are non-rotatably attached. The movable braking member 20 is connected to these arms by bolts 40 and nuts 41, which have rounded heads at the portion which comes in contact with the movable braking member 20. These bolts 40 are on the center line of the armature shaft 10 so that, if the crank 36 is placed on shaft 35 and rotated, the movable braking member 20 is pulled in a direction to release the rotating disc 17.

With reference to Fig. 6 of the drawings, there is shown in a diagrammatic manner, a track switch TS controlled by any suitable switch machine, such for example, as set forth in my Patent No. 1,466,903, dated September 4, 1923. This switch machine is shown as driven by an electric motor M having incorporated the electro-magnetic brake of the present invention. As the operation and construction of such a switch machine is completely disclosed in my above referred to patent, it is deemed unnecessary to further describe the operation and construction of the switch machine, other than is necessary to make clear the operation of the present invention.

The motor M may be controlled in any well known manner, for example, as set forth in my Patent No. 1,550,611, dated August 18, 1925, which is shown as controlled over the normal and reverse operating wire N and R respectively in combination with a common return wire C (see Fig. 63). These operating circuits are controlled by the usual pole changer contacts PC associated with the switch machine and operated thereby. Also, a contact E is provided in the common return wire C which is operably opened by the insertion of a crank 42 for manually operating said switch machine in a manner as explained in my above mentioned Patent No. 1,466,903.

The torque produced by motor M during the operation is transmitted from a pinion 43 to a bevel gear 44 with which it meshes. This bevel gear 44 is connected with a pinion 45 in which a crank 42 may be suitably inserted at such times that it is desirable to manually operate the switch machine. This pinion 45 engages a gear 46 which is connected to a pinion 47, that in turn drives the main drive gear 48.

The initial movement of the main drive gear 48 in either a reverse or a normal direction, that is, in a direction to control the track switch TS to normal or reverse positions respectively, controls a lock plunger LP through a considerable distance before a lock dog $LD^a$ disengages a throw bar TB, which is operably connected to the track switch TS; and also before the lock dog $LD^b$ disengages the lock rods $LR^1$ and $LR^2$ which are also operably connected to the track switch TS. When the lock dogs $LD^a$ and $LD^b$ have disengaged their respective locking members, the main drive gear 48 operates the throw bar TB to an extreme position which movement also operates the lock rods $LR^1$ and $LR^2$ to corresponding extreme positions, after which the main drive gear 48 continues rotation in the same direction to move the lock plunger LP to a position in which the lock dogs $LD^a$ and $LD^b$ again lock their respective locking members.

From the above description, it is clearly obvious that the switch machine motor M will release its brake incorporated therewith and operate the track switch TS in the usual manner when normal operating voltage is applied to the operating circuits. However, should it become necessary for one reason or another to operate the switch machine by manual means, the operator would insert crank 42 in a suitable slot in the hub of pinion 45. In positioning crank 42, the contact E is opened in a manner explained in my above mentioned Patent No. 1,466,903, thus preventing any application of power to the switch machine motor M during manual operation. The operator would also insert the crank 36 and rotate it sufficiently to release the disc 17, at which time the operator could then operate the switch machine by rotating the crank 42. It is necessary for the operator to continue to hold the crank 36 in a released position as the braking member 20 is normally biased to a braking position. Also, when the crank 42 is removed from its operating position, the contact E is caused to assume a normal closed position by manual means, causing the switch machine to operate to a position in correspondence with the application of power by the control lever in the interlocking tower.

The motor M can only operate the track switch TS at such times that the track switch is unlocked, and conversely, any force applied to the track switch points only tends to operate the switch machine motor at such times that the track switch is unlocked. Thus, the provision of an electric switch machine motor having an electro-magnetic brake incorporated therein, prevents the track switch TS from any movement at such times that said track switch is not properly locked.

It is to be understood, that the characteristics of the electro-magnetic brake of the present invention may be varied over a wide range by increasing or decreasing the operating air gap between the brake armature 30 and the associated pole pieces 9. It may also be understood that the present invention is to include an electro-magnetic brake having included therewith a manual releasing means which may be used or may be omitted according to the conditions to be met in practice. An electric motor having an electromagnetic brake, constructed according to the present invention, has many applications and may be used with other mechanisms than a switch machine, such for example, as used with a car retarder mechanism or the like, or any other case where there is a driven element and a power driven electric motor.

Thus, one specific embodiment of an electromagnetic brake, incorporated within one particular electric motor with the combination constructed according to the present invention, has been shown and described; and it is to be understood that this specific embodiment is chosen to facilitate the disclosure of the invention rather than to set forth its specific form, as many alterations, modifications and adaptations may be applied to the present invention to meet the requirements of practice without departing from the spirit of scope of the present invention as set forth in the appended claims.

Having described my invention, I now claim:—

1. In combination, an electric motor having a field structure and a cooperating armature, and an electro-magnetic brake comprising, a rotatable disc attached to said armature, a fixed braking member on one side of said rotatable disc, a slidable braking member on the other side of said rotatable disc, means causing said rotatable disc to be pressed between said fixed and said slidable braking members, and means including said motor field for causing said rotatable disc to be released.

2. In combination, an electric motor having a field structure and a cooperating armature, and an electro-magnetic brake comprising, a rotatable disc slidably attached to said armature, a fixed braking member on one side of said disc, a movable braking member on the other side of said disc, a spring means pressing said movable braking member toward said fixed braking member to prevent rotation of said disc, extended pole pieces attached to said field structure, a brake armature attracted when said field structure is energized, and means connecting said brake armature and said movable braking member to release said disc when said brake armature is attracted.

3. In combination, an electric motor comprising, a field structure, an armature cooperating with said field structure, a shaft for mounting said armature, a disc keyed to said shaft in a manner to be slidable in a lateral direction, a fixed braking member on the armature side of said disc, a movable braking member on the opposite side of said disc, means preventing rotation of said movable braking member, a plurality of coil springs forcing said movable braking member against said disc and pushing said disc against said fixed braking member, pole pieces attached to said field structure, a brake armature attracted toward said pole pieces when said field structure is energized with normal operating current, and means connecting said brake armature and said coil springs to release the bias against said movable braking member when said brake armature is attracted.

4. In an electric motor, an electro-magnetic brake comprising a movable disc rotated by said motor non-rotatable discs normally biased to prevent rotation of said movable disc, and means, actuated by motor winding flux, for releasing said movable disc.

5. In an electric motor, an electro-magnetic brake comprising a movable disc rotated by said motor, non-rotatable discs normally biased to prevent rotation of said movable disc, and means for releasing said movable disc actuated by application of at least normal operating current to said motor only.

6. In an electric motor, a field structure, an armature cooperating with said field structure, a movable disc attached to said armature, stationary discs normally biased to prevent rotation of said movable disc, and means cooperating with said field structure for releasing said movable disc.

7. In combination with an electric motor, an electro-magnetic brake comprising a movable disc rotated by said motor, stationary discs normally biased to prevent rotation of said movable disc, means for releasing said movable disc actuated by motor winding flux, and means manually operable for releasing said movable disc.

8. In an electric motor, a field structure having laterally extended pole pieces, a motor armature having a shaft associated with said field structure, a brake armature associated with said extended pole pieces, a movable disc mounted on said armature shaft being slidable thereon and rotatable therewith, a non-rotatable disc mounted on each side of said movable disc with each of said non-rotatable discs biased toward the other to prevent rotation of said movable disc, and means releasing said movable disc including said brake armature which is actuated when power is applied to said field structure.

WINTHROP K. HOWE.